United States Patent [19]

Barry

[11] Patent Number: 4,519,737
[45] Date of Patent: May 28, 1985

[54] ROTARY LOADER AND SIDE-COUPLING TRANSFER SYSTEM

[76] Inventor: Leonard D. Barry, 19300 Pennington, Detroit, Mich. 48221

[21] Appl. No.: 464,567

[22] Filed: Feb. 7, 1983

[51] Int. Cl.³ .................. B61K 1/00; B65G 67/22
[52] U.S. Cl. ........................ 414/337; 104/29; 104/31; 414/338; 414/392; 414/399; 294/67.2
[58] Field of Search ............ 414/334, 337, 338, 373, 414/390, 391, 392, 399, 572, 744 R, 785; 104/29, 30, 31; 294/67.2

[56] References Cited

U.S. PATENT DOCUMENTS

| | | | |
|---|---|---|---|
| 2,957,594 | 10/1960 | Brenneman | 414/785 X |
| 3,791,544 | 2/1974 | Moses | 414/785 X |
| 4,124,129 | 11/1978 | Barry | 414/337 X |
| 4,130,208 | 12/1978 | Barry | 414/343 X |
| 4,362,456 | 12/1982 | Barry | 414/337 X |

Primary Examiner—Robert J. Spar
Assistant Examiner—Ken Muncy

[57] ABSTRACT

This loader has two rotary arms which turn a load spreader fork frame off-parallel so that only one fork is extended to couple. The fork frame has a fork at each end with a cam track diagonal across the bottom engaged on the extended fork by a coupling roller extended from a vehicle to pull the fork frame to the vehicle until the roller leaves the track when the frame has engaged between pedestals on the vehicle. The frame is engaged and rotated through many more degrees and the most effective degrees of a circle for a transfer run (now over 180°) than by the side coupling of my prior loaders, thus enabling the loader to have shorter rotary arms and to extend out over the vehicle with less travel lengthwise of the vehicle so the rotary arms can be shorter and the fork narrow to fit between conveyor runs for a shorter container to be transferred between the conveyor and the vehicle (usually a railway car or semitrailer) and so the fork frame can fit between the trucks of the car or wheels of the tractor-trailer so the container is carried lower and can be larger. The fork frame pivots move in arcs tangent alongside of the open center sill of the vehicles to further shorten the load arms and to reduce the required height of the vehicle's pedestals for the load.

10 Claims, 32 Drawing Figures

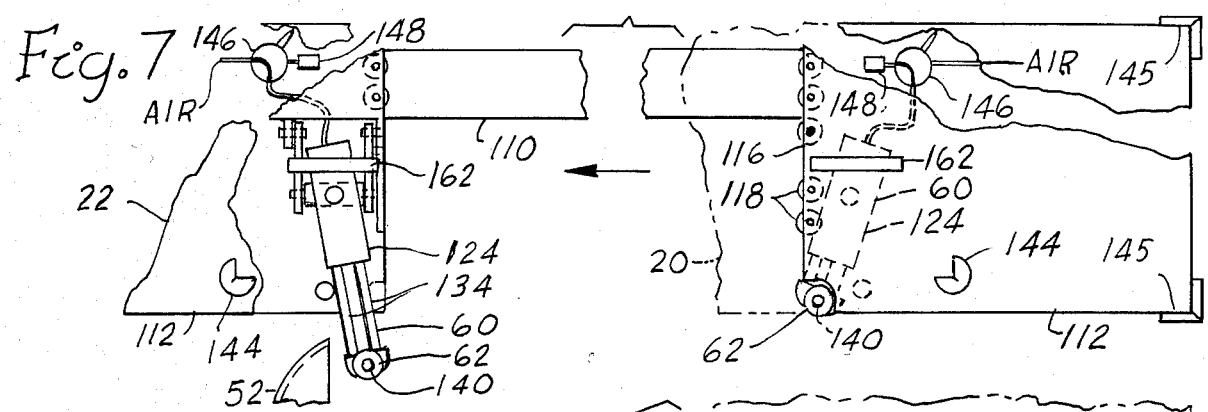
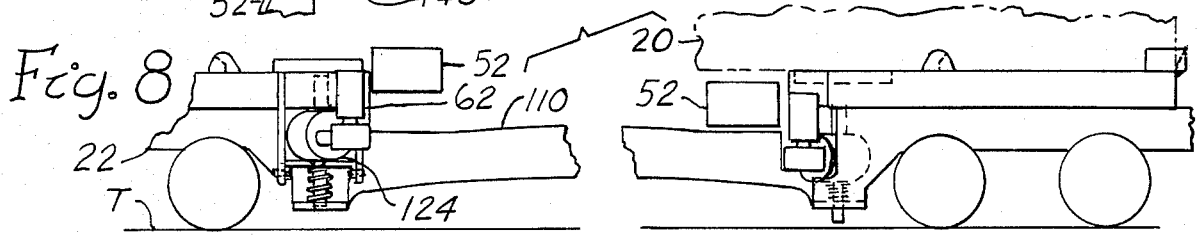
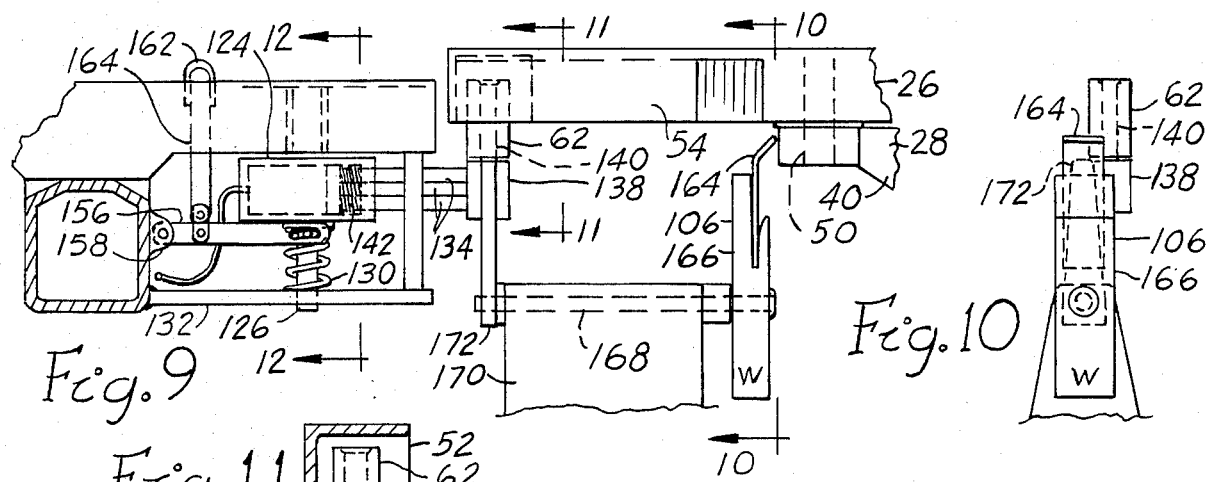
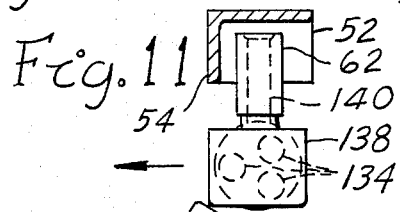
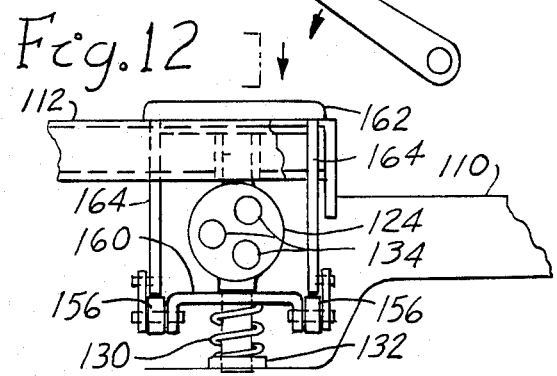
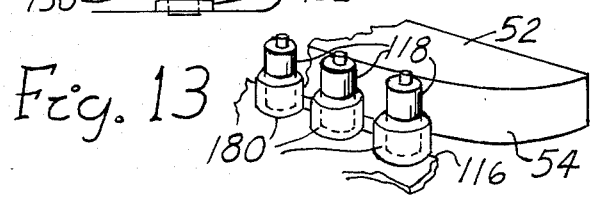
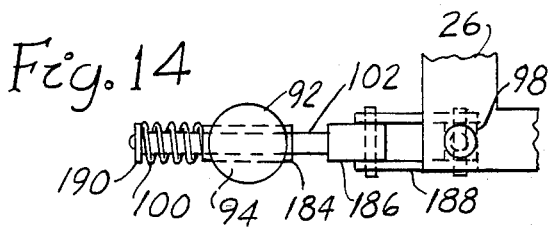
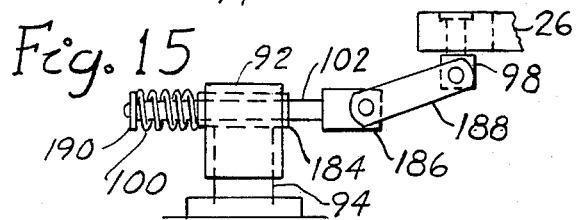
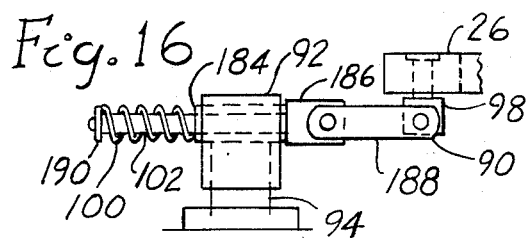

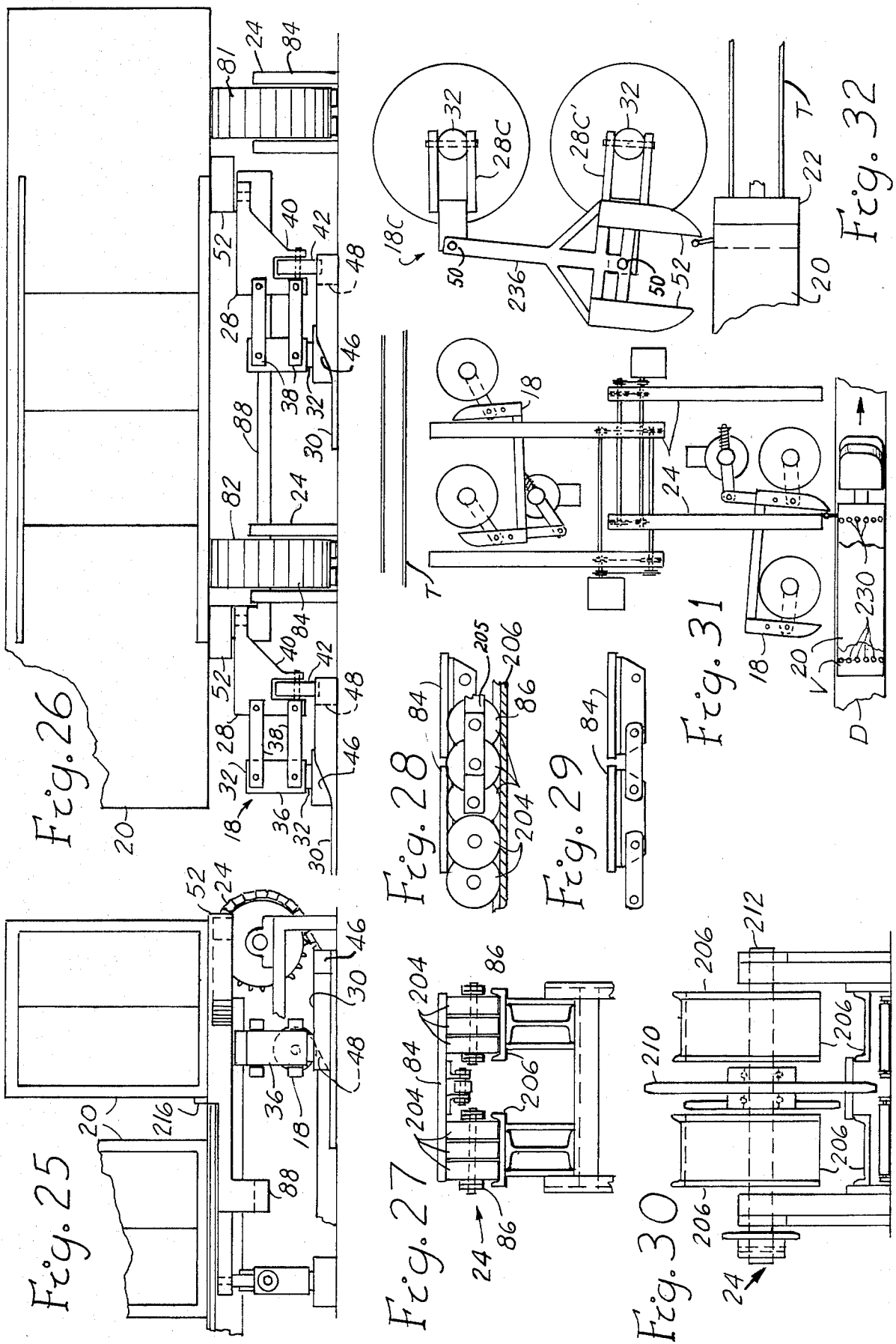

ROTARY LOADER AND SIDE-COUPLING TRANSFER SYSTEM

CROSS REFERENCE TO RELATED PATENTS AND APPLICATIONS

This invention is related to my pending U.S. application Ser. No. 338,069, filed Jan. 8, 1982, now U.S. Pat. No. 4,483,652 and to my U.S. Pat. Nos. 4,124,129 and 4,370,085, and to lesser extent relates to other of my patents.

Plural-arm rotary loaders of my U.S. Pat. Nos. 4,124,129 and 4,370,085 were designed to cooperate with an accumulating conveyor having two parallel chain runs each working tangentially to the circumference of an arc swept through by a load fork arm or disc when revolved 90° beyond where the container is lifted off of the vehicle. The minimum required length of the loader's rotary arms for a given transfer reach and the diameter of the load support discs therein severely limited the space available for the conveyor and favored the long narrow container or load. This also meant that the load lift brackets of the loader's rotary arms would swing over the vehicle's wheels necessitating the loader be carried at a higher level over the wheels than if the loader could be confined to the space between the trucks or wheels. That results in loss of load volume capacity for the car or a longer car and container than is desired to enable cooperation with the conveyor.

It is an object to provide a rotary loader which has shorter arms for cooperation with the conveyor and yet which reaches out further to the vehicle. Much reach can be added by starting the loader on the back half of the circle to better utilize the portion of the arc which carries the arm out toward the vehicle the most for a given angular movement, which is at and around 90° ahead of transfer tangency. It is therefore an object to increase the degrees of arc in the transfer run, ie. the arc the arms of the loader rotate while engaged by the vehicle to increase the reach of the loader relative to the diameter of the arc the arms make, so the arms can be shorter, the pivot posts for supporting the arms closer together, and the fork arms of the load spreader closer together to fit between wheels or trucks of a shorter car with depressed or low center sill, so the 40 foot and longer container can be carried at a low level on the car and be transferred to the conveyor by the loader which rotates a fork arm between sides of the conveyor to set the container thereacross.

Especially is it desired to provide the geometry and design to enable the leading fork to be brought closer than the trailing fork to alone cooperate with the leading side coupler and coupling design to pull the loader to start it gradually even over 100° ahead of transfer tangency with the vehicle. Increasing the starting angle to over 100° results in over a 40% increase in reach with no appreciable increase in travel parallel the vehicle. This enables the loader's rotary arms to be reduced for a given reach and enables the pivot posts for the arms to be closer together so the loader's forks and the conveyor runs can be closer together. It is an object to provide cam track ends on the forks engaged by side coupling rollers on the cars to pull the loader arms around from over 100° until they are about 60° from the point of furthest extension. At 60° the rotary arms are easily turned by the forks engaged between the facing walls of the platforms or pedestals on the vehicle.

It is an object to provide side couplers which lower and lift according as the vehicle has a container or is empty in that berth respectively. The empty loader being on a lower portion of track than when with a container.

It is an object to provide an improved conveyor for the loader, a conveyor which has plates connected in a chain over rollers connected by links for supporting cargo containers across two parallel runs or sides of the conveyor without putting the weight of the containers on the bearings of the roller chain.

Some other and further objects are to provide simple stops for positioning the loader to be coupled for a transfer run, to provide gradual cam acceleration for starting the loader capable of conveyor interface, to use the coupling roller to reduce friction while the loader is engaged with the vehicle, to provide rollers which slide up and down to reduce friction between the vehicle and fork while lifting, to provide an improved side coupling system to make the unpowered loader or its being unpowered during transfer more practical for heavy loads, to make larger containers more practical, to simplify, reduce costs, and make the system more practical, to provide simple control of the rotation of the two-arm loader when the arms are at or near in line, to overcome possibilities of dead-centers binding, to increase the allowable construction and installation tolerances possible for the loader, to provide improved applications of the loader even for use as a toy.

It is an object to further reduce the length of the loader's rotary arms to handle 40 foot containers between the conveyor and vehicles and reduce the platform height of the vehicle by providing open center-sill vehicles and rotary arms that rotate along side of the sill instead of over it. By bringing the load bearing pivots of the loader's fork close to the center sill of the vehicle the off-center loading on the fork pivots will be minimized and the pivots can be increased in size to compensate without increasing the height of the vehicle's load platforms.

It is an object to further improve over my U.S. Pat. No. 4,370,085 by avoiding the expensive underground drive for coordinating the rotary arms that cooperate with the conveyor and by omitting locators 82 on the loadspreader so existing containers need not be modified. It is an object to provide and couple behind a curved fork on the load spreader instead of one which revolves with a rotary arm and complicates the coupling and especially the uncoupling as in FIGS. 17–29 of my U.S. Pat. No. 4,370,085.

Several improvements are described herein that cooperate to reduce the size of the loader to transfer a given size container between the conveyor and a low pedestal bed vehicle to improve the direction of starting forces on the loader and to gradually accelerate the loader and eliminate starting shock by simple cam means. These other and further objects, features, and applications are attainable with this invention and are pointed out herein or should become obvious from study of this specification by those skilled in the art with reference to the drawings wherein:

FIGS. 7 and 8 are respectively plan and side views of a vehicle bed berth for a container and showing in FIG. 8 the side coupling along side a fork of the loader for an empty berth on the left and for a container on the berth on the right.

FIG. 9 is a portion of a transverse section through the vehicle's sill bed at a side coupling engaging the loader at a stop to begin a transfer.

FIG. 10 is an end view 10—10 of the stop of FIG. 9 being engaged by the side coupler to release before engaging the fork.

FIGS. 11 and 12 are respectively transverse sections on lines 11—11 and 12—12 of FIG. 9. FIG. 11 shows the side coupling hook after it has engaged the fork.

FIG. 13 is a perspective view of rollers along a vehicle's pedestal wall engaged by a fork arm.

FIGS. 14, 15, and 16 are respectively plan and side views of the guiding arm of the loader extended and retracted.

Figure 17:
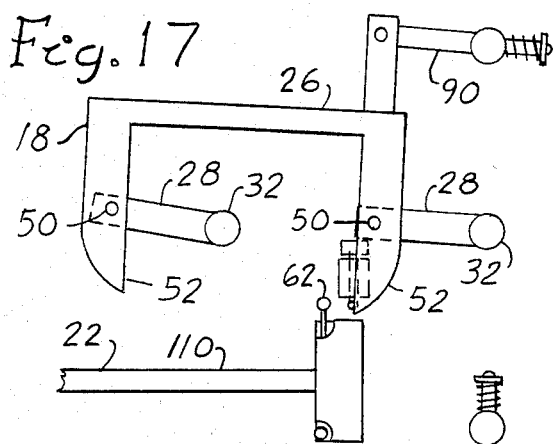
Figure 18:
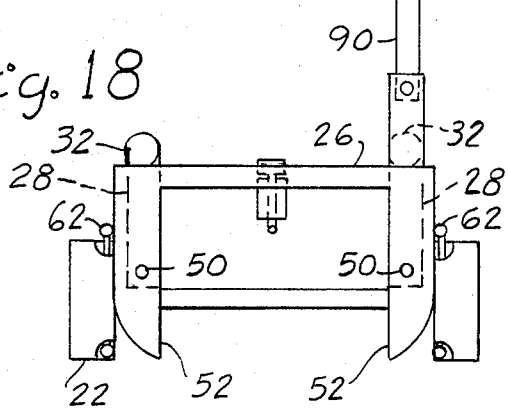
Figure 19:
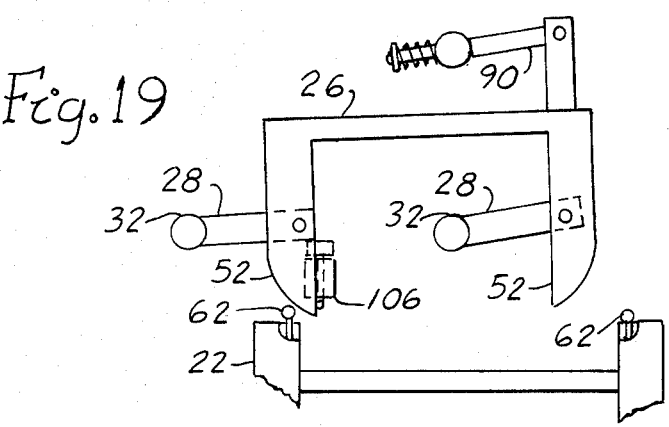

FIGS. 17, 18, and 19 are plan views of the loader in transfer sequence.

Figure 20:
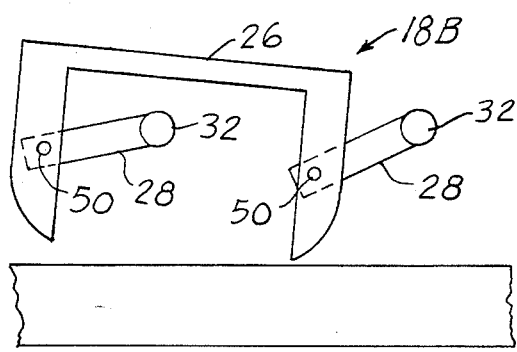
Figure 21:
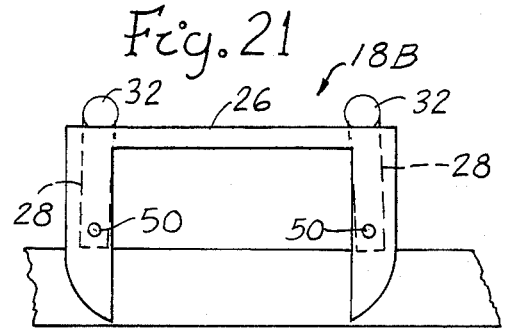
Figure 22:
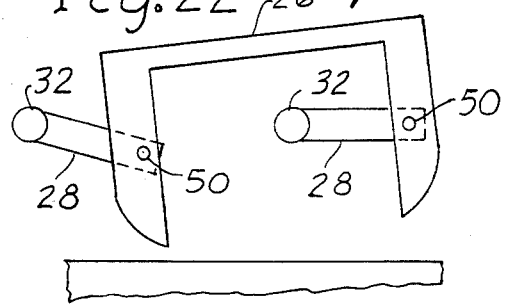

FIGS. 20, 21, and 22 are plan views of a variation of the loader having off-parallel arms turning the fork frame to place the lead fork for engagement closest to the vehicle way.

Figure 23:
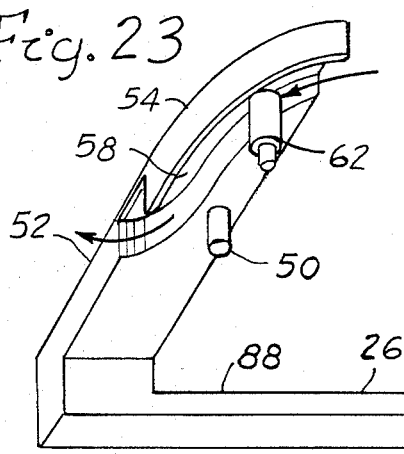

FIG. 23 is a bottom perspective of the fork frame.

Figure 24:
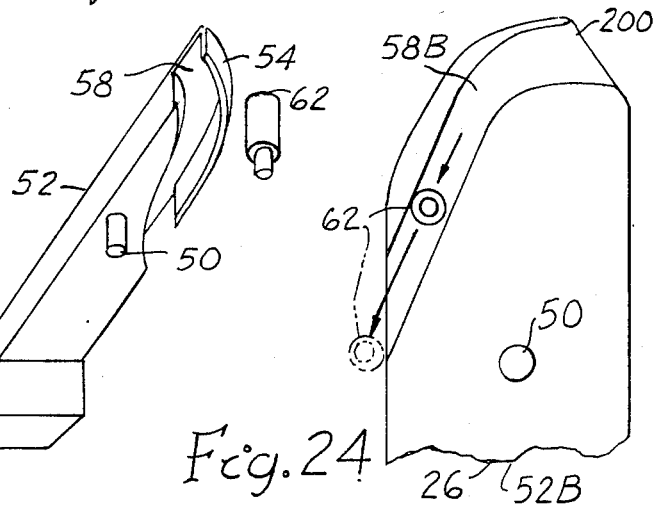

FIG. 24 is a bottom view of a variation of a portion of a coupling fork.

Figure 1:
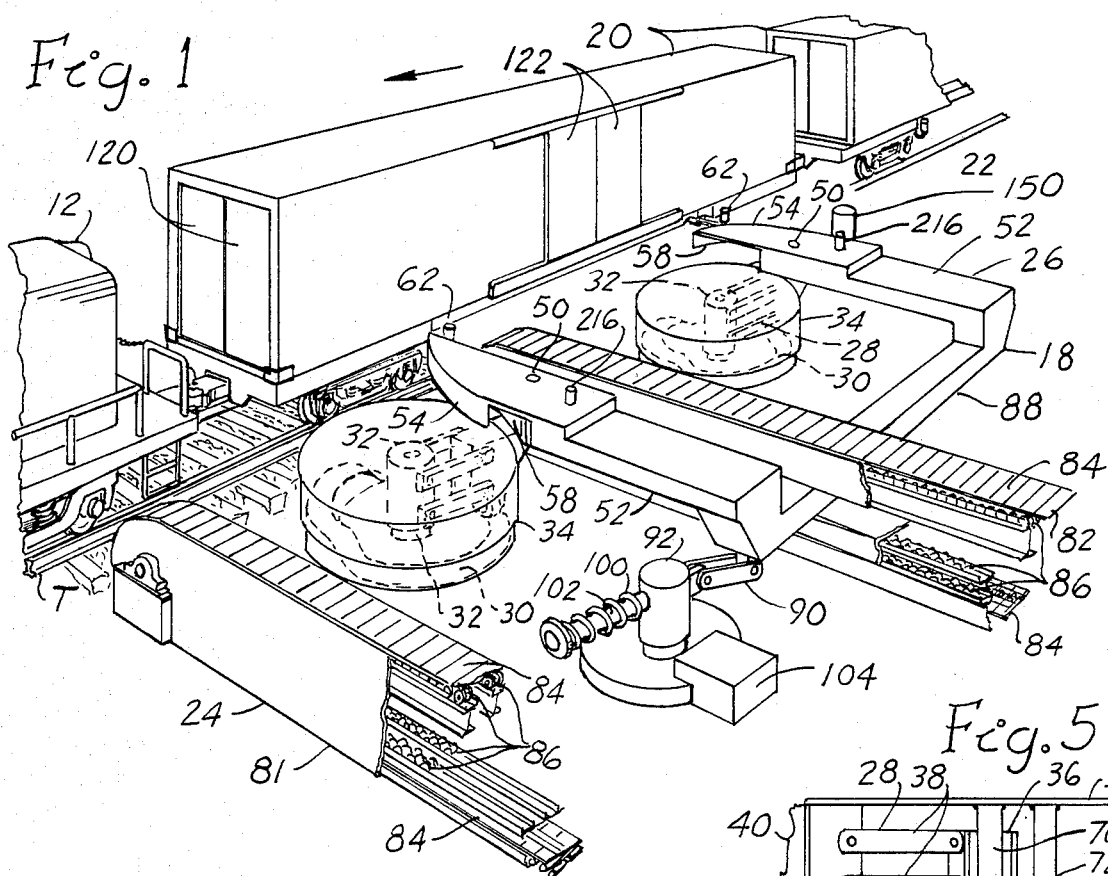
FIG. 1 is a perspective view of a rotary loader and conveyor with the loader shown about to be engaged by a car in a train passing the loader to the left for transfer of a container to the conveyor.

FIGS. 25 and 26 are respectively side and end elevation views of the loader of FIG. 1 setting a container on the conveyor.

FIG. 27 is a sectional view of the conveyor chains and track therefore.

FIGS. 28 and 29 are side views of the roller way supporting the plate chain and of the plate chain respectively.

FIG. 30 is a front view of a conveyor chain run, less the chain.

FIG. 31 is a conveyor plan with loaders at each end and semitrailer about to unload a container at the bottom of the view and the loader at the top waiting for a container to load on a train when it arrives.

FIG. 32 is a plan view of a variation of the loader along a vehicle way.

Figure 2:
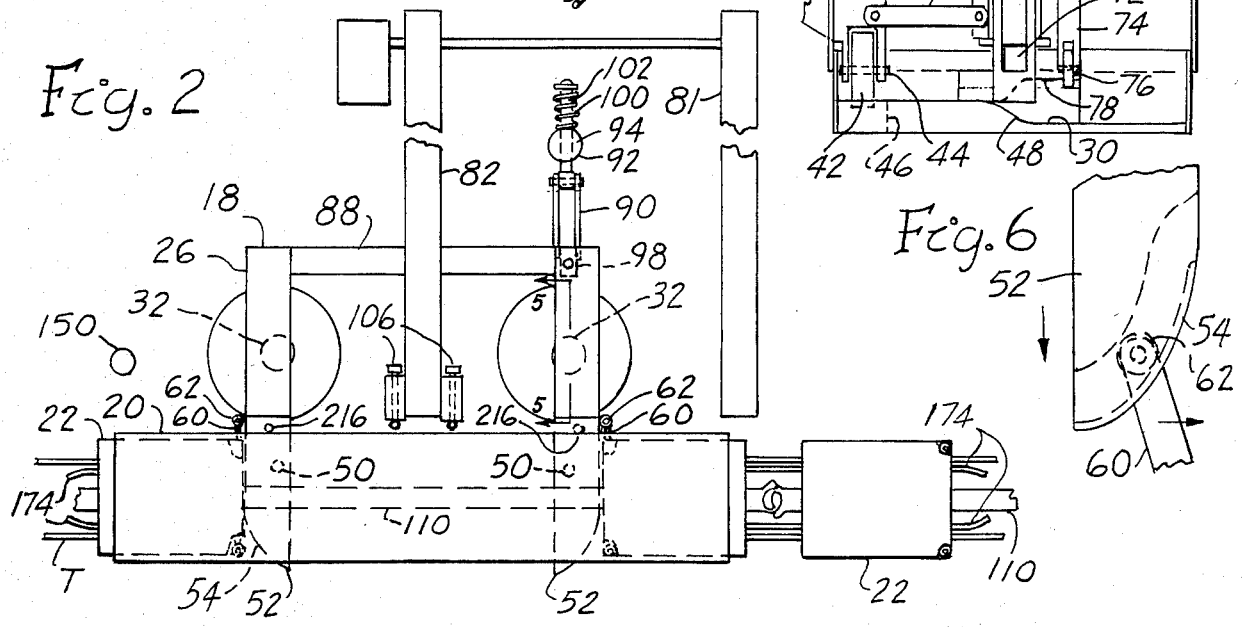
FIGS. 2, 3 and 4 are respectively plan, side, and end views of the loader engaging a container on a car in the train to transfer the container to the conveyor.
Figure 3:
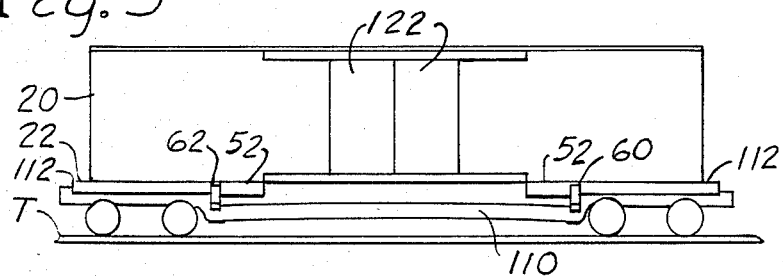

Referring to the drawings and in particular to FIGS. 1-6, train 12, slowly moving right to left on track T, FIG. 1, and left to right in FIGS. 2 and 3, passing rotary loader 18, has containers 20 on cars 22 for selective transfer to conveyor 24. A car 22 is shown about to engage and rotate the loader counterclockwise to align under and lift a container 20 from the car and translate it parallelly 90° around on the loader from track T and there set it nonstop on the conveyor which carries it back from track T as the loader completes its cycle to stop where it waits for the next transfer.

The loader has a rotary fork frame 26 supported on two rotary and substantially parallel arms 28 each of which rotate on a cam track 30 about a pivot post 32 for lifting and lowering the arm as it is revolved about the post so both of the arms lift and lower the fork frame together level. A cover 34 covers over each cam track and pivot post and is lifted and lowered with the arm.

Figure 5:
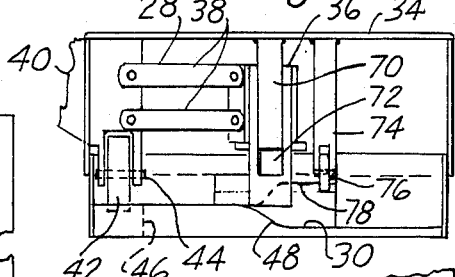
FIG. 5 is a cross-sectional elevation of a post-arm assemble with cover on the loader taken on line 5—5 of FIG. 2.

Pivot posts 32, spaced apart at equal distance from track T, each have a steel sleeve 36 supported to revolve thereon. Referring to FIG. 5, parallel arm members 38 are pivotally secured to the sleeve and to a load bracket 40 to form a parallelogram linkage arm 28 to swing vertically and to rotate about each post (similar as in my U.S. Pat. No. 4,370,085, items 58 and 59, FIG. 4). A wheel 42 is mounted on a shaft 44 on the bottom of bracket 40 and radial to the pivot post for the arm to roll on the circular cam track 30 concentric around each pivot post 32 with reversed slopes 46 and 48 90° apart in the track for the wheels to lift and lower the load brackets level. The two load brackets 40 support fork frame 26 on pivot pins 50 on arms 28 at substantially equal distances each from their pivot post.

Figure 6:
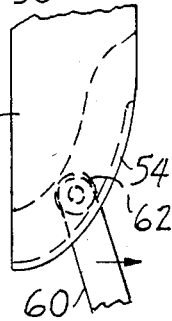
FIG. 6 is a plan view of the end of a fork arm of the loader engaged by a side coupling arm extended from a vehicle.

Fork frame 26 has two load support arms 52 which each have an outfacing side vertical engaging wall 54, FIG. 6, curved convex or sloped from each out-facing side to the front and opposite side at the engaging end of the fork. Wall 54 is open behind it from below to form a cam track 58 open at its ends and in which a coupling arm 60 from the car engages a roller 62 to start the loader by pulling the fork arm 52 to the car.

Cover 34, a cylindrical cap concentric over each pivot post 32 and cam track 30, laps over an inner cylindrical stationary wall against which it rotates and sheds rain and preferably seals out dirt as it lifts and lowers. The cap has a central depending tube 70 secured thereto which turns and slides up and down in a vertical pocket or tube 72 central within the pivot post 32. The cover is supported on bracket 40 to rotate therewith and by a depending leg 74 opposite the arm which supports the cover. Leg 74 has a wheel 76 which runs on a small cam track 78 concentric about the post. Track 78 has slopes corresponding to the slopes in track 30 but shifted 180° around the track to lift and lower the cover in unison with the bracket 40.

Conveyor 24 has two sides 81 and 82 of plate chain 84 over roller chain 86 across which the loader sets or lifts off containers 20. The fork arms 52 are substantially parallel the conveyor sides and are translated off-parallelly along side of the conveyor runs, one fork always being between the sides while the other fork is always outside of the conveyor. The fork arms are connected by a depressed member 88 along the back behind the covers and operated in space between the top and bottom runs of side 82 of conveyor chains. The smaller the circle arms 28 operate in the less the span the conveyor must have to cross the fork frame member 88.

Though fork 26 is translated substantially parallelly on parallel arms 28 it is held slightly off-parallel through dead centers by a third arm 90 extendible in length from slightly shorter (8/9 th's) to substantially equal in length to arms 28. Arm 90 is mounted through a cap 92 that revolves on a vertical pivot post 94 and is pivotally jointed between the cap and a clevis 98 swivel mounted to frame 26 to follow its vertical movements and turn therewith. Arm 90 is held retracted by a compression coil spring 100 about tube 102 (see FIGS. 14-16 for details). Cap 92 is rotated by motor and drive 104 through a clutch to rotate arm 90° to translate the fork frame 26 which rotates arms 28 to return to a stop 106 at the beginning of each transfer run.

Figure 4:
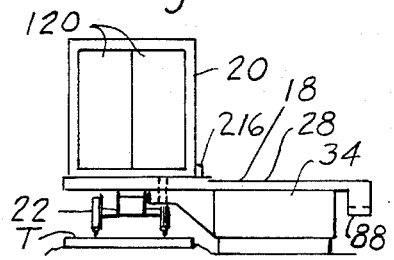

The loader is held at the stop 106 at the beginning of the transfer arc and is released by a side coupling arm 60 on the vehicle for transfer. The loader in FIG. 1 is about to be engaged by a roller 62 extended from a car 22 which pulls the fork frame out under the container on the car as shown in FIGS. 2, 3, and 4 and is lifted by a rise, slopes 46, in cam tracks 30. When the loader's arms 28 are rotated 90° further clockwise a slope 48 in each cam track 30 lowers the fork 26 to set the container on plate-over-roller conveyor 24 as shown in FIGS. 24 and 25, which carries the container away from the loader and track T as the fork returns to starting position against a stop 106 to hold it until coupled by a car in the train.

Referring to FIGS. 1–4 and 7–9, car 22 has an open depressed center sill 110 between end platforms 112 with spring recessable corner locators 144 for curbing corners of existing 40 foot containers and corner locators 145 for future 50 foot containers 20; or locking means can be provided for securing the container or pallet (as in my U.S. Pat. No. 4,362,456, FIGS. 17–21 and 23–24, item 220). The container or load bridges across the platforms so the loader can reach over the sill and under the load as the loader locates itself between the platforms' vertical facing side walls 116 or rollers 118 in alignment lengthwise the car for transfer of the container to or from the car. The ends of brackets 40 engage the sill of the car to steady it and locate on it during transfer. The container 20 can be of box car size with end doors 120 and side doors 122, or a flat bed pallet, tank, or other suitably sized load unit for engaging the car or vehicle across the open span for the forks.

The car 20 or other vehicle has two side couplings 60 on each side of each berth as shown in FIGS. 2 and 6–12. Each coupling 60 has a trunnion mounted cylinder 124 having a vertical trunnion axis with upper trunnion extending up to turn and slide up and down in a hole in the platform of the vehicle and the cylinder's bottom trunnion extending down through the coil of a supporting spring 130 and through a slip hole in bracket 132 secured to the side of the sill. Cylinder 124 has two or more rods 134 (preferably three) extending from its piston therein through holes in the head of the cylinder to a coupling block 138 which is thus held from rotating on the cylinder. The coupling block has an upstanding shaft 140 with coupling roller 62 thereon. Coil springs 142 around rods 134 in cylinder 124 retract the coupling arm 60 into a side pocket or slot in the platform. Air pressure is connected from line AIR through spring closed hand valve 146 on the side of the car to the head end of the cylinder 124 of the coupler 60 on the opposite side of the car so an operator standing on the opposite side of the track from the loader can open the valve momentarily to connect air to extend the coupling to engage the loader. Valve 146 is closed by its spring when the operator releases hold and air is bled from the cylinder through a bleed valve 148 so the coupler will retract after a time delay sufficient to have engaged the loader. Engagement of the coupler with the loader prevents its retraction until after it comes out from behind the cam wall of the coupling fork.

The coupling height required depends on whether the loader is at the low or high end of the transfer run. At the low end it is checked to be empty by a post 150, FIGS. 1 and 2, which would interfere with any container on the loader. At the high end stop the loader should have a container for a vehicle and the vehicle berth must be empty. The weight of the container, even when empty, is used to lower the couplings 60 to clear under the forks 52 on the loader when on the high side of the transfer run and set couplings 60 at the height to engage the leading fork of the empty loader on the low side of the transfer run. Each coupling 60 is lifted by a spring 130 if the berth is empty and is lowered by a lever 156 pivotally mounted to the sill at 158 on each side of the cylinder 124 and by a slot and pin connected to yoke 160 connecting levers 156 parallel over the lower trunnion of the cylinder above spring 130. A load detecting bar 162 extends horizontally in a slot in the bed of and parallel with the vehicle. A rod 164, held from rotation by a slot in the platform, depends from bar 162 to levers 156 to force them down to force cylinder 124 down against spring 130 when a container is set on the bed, depressing bar 162 flush (a slight distance) but lowering the coupling roller 62 to a height to couple only an empty loader.

The loader is held by a stop 106 at each end of the transfer run to be at the correct distance from the track or vehicle way to be coupled only by an extended coupler. Stops 106 are located one on each side of the conveyor side between the pivot posts 32 to be engaged by the forward fork arm and released by an extended coupling arm 60. Each coupling stop 106, FIGS. 9 and 10, has a latch of spring steel 164 against which the bracket arm 40 then between the pivots is stopped. The latch only limits movement of the loader toward the track or way. The stop latch is supported on top of an arm 166 weighted to hold it vertically. Arm 166 is secured to shaft 168 supported in bearings in base 170 and connected to an upstanding lever arm 172 positioned to be engaged by an extended coupling arm 60 to turn shaft 168 and arm 166 to release the stop as the coupling roller 62 starts to ener the opening in the end of the forward coupling fork 52 to pull the loader into full engagement for transfer with the car. The track T along the loader has guard rails 174 to take any excessive side forces on the car.

Referring to FIGS. 1 and 6 and 23–24, each fork arm 52 has a side opening in the cam wall 54 for the roller 62 to come out from behind the cam wall when the arms have moved to about 60° before full engagemnt, where the facing side walls 116 of platform 112 engage the loader and push it around with the car.

Referring to FIG. 13, as the forks 52 enter between ledges 116 on the vehicle, preferably pins or rollers 118 with loose rings 180 thereon are engaged by the forks to reduce friction between the forks and the vehicle especially when the forks are lifted by the cam tracks 30 to lift a load from the vehicle. Then rings 180 are engaged by the trailing fork 52 and lifted on their shaft or roller with the fork to reduce the force of lifting the container off of the vehicle.

When the loader is at either stop 106 its arms 28 are nearly in line with each other, ie at dead centers. Then the third arm 90 rotates the fork frame out of alignment as seen in FIGS. 17 or 19 at opposite stops. Arm 90, as seen in FIGS. 1–2, revolves about pivot post 94 spaced in back of a cover 34 far enough for the arm to clear the cover. Arm 90 can be designed and located to push or pull the fork frame but is preferably designed to pull the fork frame and is located between the sides of the conveyor. As shown in FIGS. 14–16, arm 90 includes a tube 184 running through a sleeve through rotary cap 92 on the pivot post 94, a rod end 186 on the tube 184 connected by link 188 to a swivel 98 on the fork frame 26 or as in FIGS. 17–19 to an extension of the fork frame. The rod end is pulled back against the cap 92 by spring 100 over the tube between a washer or cap 190 on the end of the tube and the cap 92. Arm 90 is slightly shorter in length than the load arms between the axis of their pivot post and the axis of their pivot on the fork frame to pull the fork which is between the pivot posts 32 closest to the track so it alone can be coupled by an extended hook roller 62. Arm 90 extends against force of spring 100 to at least equal the length of the load arms to prevent binding during translation of the fork frame. The loader, with or without the conveyor, is operated as the sequence FIGS. 17-19 show, rotating the fork frame a few degrees oppositely every 180° of rotation of arms 28.

Referring to FIGS. 17-19 in sequence for operation with a vehicle moving left to right and in reverse order for the vehicle moving right to left: The loader in FIG. 17 is at a stop and about to be engaged by a vehicle 22 approaching from the left with forward hook roller extended to engage behind the curved side plate of the fork arm between the pivot posts 32. The fork frame is turned by the third arm 90 being shorter than the two substantially parallel and equal load arms 28. In FIG. 18 the loader is fully engaged by the vehicle and the engaging roller has come out from behind the cam wall 54 to continue to roll on the outer face of the fork. The rear roller 62 can now be pushing the trailing fork arm to reduce friction of the arm against the rear pedestal as the fork arms are lifted by the cam tracks about each pivot post 32. In FIG. 19 the fork frame is rotated out from the vehicle and is pushed by the rear roller and carried by momentum to clear from the train.

Referring to FIGS. 20-22, the loader can be simplified if not required to carry through dead centers position of its arms 28 as the conveyor required. This loader 18B is similar to 18 except that pivot posts 32 are spaced closer together than the pivots 50 on the fork frame 26 to turn the fork frame at ends of the transfer run, FIGS. 20 and 22, so that the lead fork (the one between pivot posts 32) is closer to the vehicle way than the trailing fork, so that only the lead fork can be engaged by the side coupling. This turning of the load fork frame turns the forks transversely straight with the vehicle, FIG. 21, for the picking up or setting down of a container thereon straight.

Referring to FIG. 23, oppositely symetrical coupling cam tracks 58 on the bottom of fork frame 26 are shown with relation to coupling rollers 62, one of which is shown engaged in the coupling track groove 58 of the lead fork 52 while the other roller 62 is trailing behind the trailing fork 52. Notice how the end fork arms are oppositely curved and the coupling track 58 runs diagonally across each fork 52 from the infacing front tip curving back to the side exit. The lead roller 62 tracks through the coupling cam groove right to left while the trailing roller 62 approaches the outer face of the fork at the right and does not enter the coupling track during this transfer. The coupled roller 62 follows through the coupling groove and out as seen by arrows in FIG. 23 and remains outside of the fork as the loader is pushed out from the vehicle by the trailing roller 62.

Fork 52B, FIG. 24, is a variation which has a deflecting slope 200 over the enterance to its groove 58B which after the gradual starting curve runs straight diagonally to the side exit. Slope 200 deflects a roller 62 which is too high from catching on the fork. Where space is available the fork can be widened and its track gradually curved and sloped to start the loader more gradually for a given vehicle speed and with less side force on the vehicle.

The curved outfacing sides of the fork give it tolerance to engage between platforms 112 on the vehicles etc., which is the preferred configuration so that the vehicles have platforms at the ends of the load instead of one in the middle. But if the forks are to couple an object in between them instead of along their outfacing edges the forks 52 would be put in each others place or inverted. Only the trailing fork and coupling roller would then be used to couple the loader and the rear rotary arm would be extended by spring to push the fork frame to turn the trailing fork closest to the vehicle way to alone be engaged by a side coupling roller to start the loader.

Referring to FIGS. 25-26 where the loader 18 sets containers 20 on conveyor 24 or lifts them off one at a time nonstop similarly as in my U.S. Pat. Nos. 4,124,129 and 4,370,085. The improvement here is in the reduction of the spacing required between the runs of the conveyor because of the improved loader and side coupling and in details of the conveyor.

Referring to FIGS. 25-30, the roller chain 86 has rollers 204 of larger diameter than the height of the chain links 205 so the container or plate chain 84 is supported on the rollers 204 on channel 206 directly so the weight of the container is not supported on the roller chain's bearings. The container (and plate chain 84 if used) moves at twice the speed of the roller chain 86. The roller chain has overlapping rollers 204 as seen in FIG. 28 to support the plate chain on enough shafts of rollers 204 to keep the plates from tipping. The roller chain runs over end sprockets or curved channels 206, FIG. 30, and the plate chain runs over end sprockets 210. At the loader, sprockets 210 are each mounted to turn on or with a short shaft 212 for each side of the conveyor so an arm 28 can revolve between the runs. The return run of the roller chain is supported in channels 206 over the return run of the plate chain supported on rollers in a usual manner. Each plate chain is driven by a drive chain sprocket secured on the hub of its drive end sprocket 210 mounted to rotate on the drive shaft on which the roller chain drive sprockets are secured and driven at half the speed of the plate chain by proper ratio between the output sprockets of the drive and the driven sprocket on the drive shaft and plate chain drive sprockets which rotate on that shaft. Optionally only the plate or roller chain need be driven, and the conveyor, its drive, and controls follow general conveyor practice.

OPERATION

To unload a container from a car, an operator stands on the opposite side of track T from the loader in line with the trailing fork. When the first forward end platform of the car with container for transfer passes the trailing fork 52, the operator opens valve 146 to extend the coupling cylinder directly on the opposite side of the car to extend the coupling roller 62 between the forks 52 of the loader to engage the forward leading fork of the loader to pull the fork frame 26 to rotate against force of spring 100 to align the forks 52 at right angles to the car and rotate arms 28 counterclockwise in FIGS. 1 and 2 to engage the fork frame between platforms 112 to transfer the container from the car to the loader and turn the loader's arms 28 90 more degrees to where they set the container on the conveyor and continue to be rotated by drive 104 to the stop 106 from which the fork frame was started, to wait, to be coupled for transfer of the next container selected. To load a container on a car moving in the opposite direction, left to right in FIG. 1, the conveyor is moved forward to carry the first container to a stop set by limit switch control of the conveyor so the loader when driven lifts under the container, engaging pusher tabs 216 on forks 52 to align the container over the forks before lifting the container, where it is held at the stop to wait for a vacant car to be engaged by the operator. The operator stands on the opposite side of the track from the conveyor facing the fork arms. When a car with an empty berth aligns the forward empty platform with the trailing fork the operator opens valve 146 under the platform to extend the forward coupling arm 60 on the opposite side of the car to couple the forward fork arm 52 of the loader to pull it to rotate against force of spring 100 to align the forks at right angles to the car and rotate arms 28 to engage the fork frame between the platforms 112 as the forward coupling roller 62 leaves the coupling cam track of the forward fork. The fork frame is then moved with the car and lowered when fully extended over the car to set the container thereon. Arms 28 continue to rotate to carry the fork frame full circle to take the next container brought forward on the conveyor to wait for the next transfer.

EXTENDED APPLICATION

Referring to FIG. 31 where two loaders 18 are shown at opposite ends of a conveyor run of two storage conveyors 24 overlapping at their drive ends to align the containers exactly for the loaders. The loaders and conveyors connect track T at the top with driveway D at the bottom. The two loaders are both clockwise loaders (counterclockwise unloaders) to feed the containers in the same direction along track T and driveway D. One conveyor could connect the loaders if each loader were opposite hand to the other to feed the containers back in the direction they came from.

A semitrailer V on driveway D is shown in FIG. 31 about to engage the loader 18 along the driveway for unloading a container 20 to conveyors 24. Trailer V has a row of Jacking pedestals 230 similar as in FIG. 16 of my U.S. Pat. No. 4,130,208, across each end of the platform to form two walls 116 between which the fork frame 26 registers for transfer. Or the trailer can have an open sill and platforms 112 as in FIG. 17 of this application. Containers removed from semitrailers along D can be moved up conveyors 24 to wait for trains from the left to be loaded in empty berths by the loader along track T. In reverse, trains from the right can be unloaded by the loader along T and moved by conveyors 24 to the loader along D which sets the containers on trailers with beds similar to car 22 or beds with raised jacks 230 moving to the left on driveway D. After the loader along D puts a container on raised jacks 230 the jacks are lowered so the container on the trailer can clear underpasses etc. Track T can be paved in a driveway D so only one loader 18 is needed to transfer between trailer and train if both the car and trailer have the same height of platforms 112 or height with raised jacks 230.

A VARIATION

A variation, the loader 18C, FIG. 32, has two nearly parallel rotary arms 28C and 28C' mounted on pivot posts 32 in line at right angles back from the vehicle way or track T. Arms 28C and 28C' pivotally support a load spreader frame 236 on pivots 50. Frame 236 has fork arms 52 spaced as close as need be. Arm 28C is behind 28C' and is shorter so the fork frame is turned slightly so whichever fork 52 is closest to the pivot post is always closest to the vehicle way to be the fork engaged by the vehicle having a coupling hook arm 60 extended for transfer.

Having thus described my invention including the preferred embodiment and application thereof I do not wish to be limited to the disclosure herein but intend to cover by the appended claims all modifications and applications which come within the true spirit and scope of this invention.

I claim as my invention:

1. In a rotary loading system having a vehicle way, at least one vehicle thereon having a berth for carrying a container, a rotary loader having a fork frame, two substantially parallel rotary arms, two pivot posts vertically positioned equal distance from said way to which said arms are mounted to rotate horizontally, said fork frame being pivotally mounted on each said arm an equal distance out to carry said fork frame over an arc over said way, and means for lifting and lowering said fork frame when extended over said way for transfer of the container, said fork frame having a fork arm at each end for engaging under the container and coupling with the vehicle: each said fork arm having a depending vertical wall or track running diagonally of the fork arm sloped toward the other said fork arm to the end of the fork arm facing said way, a side coupler on said vehicle for engaging said fork frame for transfer of said container, said coupler including an arm pivotally mounted to said vehicle and extending out side ways from the vehicle and having an upstanding hook for engaging behind said wall for engaging and pulling said fork into an opening in said car for aligning under said berth for transfer of said container, said wall ending with an opening for said hook to come out from behind the wall where said fork frame is engaged enough to move with said vehicle for transfer, and pivot means for supporting said hook to follow said wall and come out from under said fork arm, and load actuated means for raising and lowering said hook to correspond with the height of said fork arm.

2. A system as in claim 1 and means for turning for positioning said fork frame for coupling so the fork arm which is then between the rotary loader's said rotary arms which is to be engaged first is substantially closer to said way so as to be the only fork arm engaged by said hook to begin the transfer.

3. In a system as in claim 2, said means for turning for positioning being the distance between the pivot post center lines being less than the spacing between the pivots on said fork frame.

4. A system as in claim 3, said fork frame being pivotally mounted to each of said rotary arms with tolerance for slack lengthwise these arms for movement of said arms through dead centers.

5. In a system as in claim 2, said means for turning for positioning said fork frame being a third pivot post and an extensible rotary arm which is substantially parallel to said two rotary arms, said extensible rotary arm is adjustable along said third pivot post and connected to said fork frame for translating said frame with some turning, resilient means on said extensible rotary arm, said extensible rotary arm being extensible against said resilient means to complete the full circle of rotation, a transfer arc of approximately 180° at the ends of which said extensible rotary arm is retracted to turn said fork frame so whichever said fork arm is then between said two rotary arms only is close enough to said way to be engaged by a said hook when said vehicle moves along said way with said hook extended.

6. In a system as in claim 5, said extensible rotary arm being spring extensible to lengthen when pulled so said fork frame can translate full circles about said pivot past.

7. A system as in claim 1 and latching stop means located between said pivot posts to hold the loader in starting positions at ends of a transfer arc, and means engaged by said side coupler for releasing said stop means to release said loader for transfer.

8. In a system as in claim 1 a conveyor for receiving loads from said loader, said conveyor having two spaced apart sides or runs of roller chain the rollers of which support the containers across the runs to free the bearings or joints in the chain from carrying the weight of the container.

9. A fork frame for a rotary loader used to engage and transfer a load which is moving in a longitudinal direction, the fork frame having a fork arm at each end, vertical pivot means at each end of the frame for mounting said fork arms to the respective ends of substantially parallel rotating arms so as to move therewith, a side coupling cam roller track facing to the back on the bottom of each said fork arm and sloping from the infacing sides of the outer front ends of each said fork arm and across the fork arm toward the back and out the outfacing sides of each said fork arm for a side coupling roller on the longitudinally moving load to engage with in order to pull the frame out for a load transfer arc.

10. In a rotary loader having two first vertical pivots spaced apart, a rotary arm mounted to rotate radially about each pivot and a load lifting fork frame having two fork arms, each fork arm having a second vertical pivot for pivotally mounting said frame at equal distance out from said first pivot on each said rotary arm; wherein the distance between said first pivots is slightly less than the distance between said second pivots enough to thus form a sufficiently-off-parallelogram linkage so as to turn said fork frame oppositely when approaching opposite ends of a transfer arc to exend only the fork arm which is between said first pivots toward a vehicle way enough for side coupling a vehicle thereon, said load lifting fork frame having said fork arm at each end and extending toward the way a dependent coupling track or wall running diagonally across the bottom of each said fork arm said wall facing to the back away from said way and open at the ends for a coupling roller on a vehicle to pass by the first said fork arm and engage with the second said fork arm to pull the load fork frame out in its arc over the vehicle way to engage for transfer of a load by movement of the vehicle in either direction along the way, the vehicle having the coupling rollers extendable and spaced to align both said fork arms to engage the farthest fork arm first to align the fork frame with a given spot or berth on the vehicle in either direction of travel.

* * * * *